2,930,715
SURFACE TREATED RUBBER ARTICLES

Lawrence Michael Dadson, Manchester, England, assignor to Imperial Chemical Industries Limited, London, England, a corporation of Great Britain No Drawing. Application October 21, 1957
Serial No. 691,159

Claims priority, application Great Britain
October 22, 1956

6 Claims. (Cl. 117—139)

This invention relates to improvements in or relating to rubber compositions, and more particularly to rubber compositions made from latex rubber.

It is known that certain physical properties of rubber compositions, and especially of compositions made from latex rubber, are very susceptible to the action of moisture. In particular, the electrical insulation properties of a latex rubber vulcanisate rapidly deteriorate when the vulcanisate is kept in a moist atmosphere. As a result of this, latex rubber has not hitherto been considered to be of value for electrical applications, for example in electric cables.

It has now been found that this deterioration can be minimised by the treatment of the rubber, before vulcanisation, with certain complex derivatives of chromium. These complex derivatives of chromium are described in U.S. specifications 2,273,040, 2,356,161 and 2,524,803, being complex chromium compounds of the Werner type in which a trivalent nuclear chromium atom is coordinated with a carboxylic acido group, for example stearato, oleato or laurato chromic chloride or nitrate.

Thus according to the present invention there is provided a process for improving the resistance of rubber compositions to the action of moisture which comprises treating the surface of the rubber composition, before vulcanisation, with a complex chromium compound as hereinbefore defined.

The rubber compositions may be made from natural or synthetic rubbers, for example polymers and copolymers of butadiene, including copolymers with for example styrene or acrylonitrile, or mixtures thereof. There may also be used grafted natural rubbers, that is to say rubbers which are made by polymerising a suitable monomer in rubber latex so as to form side chains on the rubber molecule, for example a natural rubber/styrene graft polymer.

Pigments, fillers, antioxidants, stabilisers, accelerators, and other known adjuvants of value in the manufacture of rubber compositions may also be incorporated in the rubber compositions by known procedures.

The process of the present invention is effective in improving the properties, particularly the electrical properties, of rubber compositions, especially those compositions made from a latex rubber. The rubber composition is made in known manner, incorporating any desired adjuvants, and is formed into the desired shape, for example by dipping or slush moulding. It is dried, and is thereafter treated with the complex chromium compound, and then vulcanised in the usual manner, for example by heating in hot air.

The complex chromium compound of the Werner type may contain a trivalent nuclear chromium atom coordinated with any carboxylic acido group, for example acido groups derived from fatty acids, for example stearic acid, lauric acid, and oleic acid, or unsaturated acids for example methacrylic acid and isopropyl acrylic acid. The chromium atom may also be coordinated with other molecules, atoms or radicals, for example water or chlorine.

The complex chromium compounds are conveniently manufactured according to the processes described in the above U.S. specifications, as water-soluble solids or as solutions in lower aliphatic alcohols, for example isopropanol. Thus they may be made by heating a basic chromium salt, conveniently a basic chromium chloride, with a carboxylic acid substantially in the absence of water, or by reducing chromium trioxide or chromyl chloride to a salt of trivalent chromium while in contact with a carboxylic acid, for example by reduction with an alcohol.

The complex chromium compound may readily be applied to the rubber composition for example from solution by dipping techniques.

The quantity of the complex chromium compound to be applied in the process of the present invention is not critical, and a suitable quantity may conveniently be applied by dipping the rubber compositions in solutions containing approximately 2% of the complex chromium compound.

The invention is illustrated but not limited by the following examples in which the parts and percentages are by weight.

Example 1

A mix having the following composition, in parts by dry weight, was prepared from a natural rubber latex.

Rubber hydrocarbon _____ 100
Ethylene oxide fatty alcohol condensate (stabiliser) _ 0.2
Sulphur _____ 1.0
Zinc oxide _____ 1.5
Zinc diethyldithiocarbamate _____ 1.0

Latex rubber films were prepared from this mix by flowing the mix on to glass plates and drying at room temperature. One film was vulcanised by heating in air at 100° C. for 30 minutes; a second film was steeped for 30 seconds in a 2.0% solution of methacrylato-chromic chloride in a mixture of isopropanol, acetone and water and then dried at room temperature, and then vulcanised by heating in air at 100° C. for 30 minutes. The films were allowed to cool at room temperature, and then their volume electrical resistivity was measured. The films were then suspended for 7 days in the vapour above a saturated solution of ammonium chloride, and then removed and the measurements repeated. The following values of volume electrical resistivity were obtained:

|  | Freshly prepared | After 7 days over saturated ammonium chloride solution |
| --- | --- | --- |
| Untreated film | 2.58×10$^{12}$ ohms/cm | 0.007×10$^{12}$ ohms/cm |
| Film treated with methacrylate chromic chloride | 36.3×10$^{12}$ ohm /cm | 75.8×10$^{12}$ ohms/cm |

Example 2

A mix having the following composition, in parts by weight, was prepared from a natural rubber/styrene graft polymer:

Rubber hydrocarbon _____ 100
Ethylene oxide fatty alcohol condensate (stabiliser) _ 0.2
Sulphur _____ 1.0
Zinc oxide _____ 1.5
Zinc diethyldithiocarbamate _____ 1.0

Latex rubber films were prepared from this mix by flowing the mix on to glass plates and drying at room temperature. One film was vulcanised by heating in air at 150° C. for 2 minutes; a second film was steeped for 30 seconds in a 2.0% solution of stearato chromic chloride in a mixture of isopropanol and water, and then dried at room temperature, and finally vulcanised by heating in air at 150° C. for 2 minutes.

The films were allowed to cool at room temperature, and then their volume electrical resistivity was measured. The films were then suspended for 7 days in the vapour above a saturated aqueous solution of ammonium chloride, and then removed and the measurements repeated. The following values of volume electrical resistivity were obtained.

|  | Freshly prepared | After 7 days over saturated ammonium chloride solution |
|---|---|---|
| Untreated film | $3.12 \times 10^{14}$ ohms/cm | $0.3 \times 10^{14}$ ohms/cm. |
| Film treated with stearato chromic chloride. | $1.85 \times 10^{14}$ ohms/cm | $9.24 \times 10^{14}$ ohms/cm. |

The natural rubber/stryene graft polymer latex was prepared by stirring styrene monomer into latex containing tertiary butyl hydroperoxide and adding tetraethylene pentamine.

What I claim is:

1. Process for improving the resistance of rubber compositions to the action of moisture which comprises treating the surface of the rubber composition, before vulcanisation, with a complex chromium compound of the Werner type in which a trivalent nuclear chromium atom is co-ordinated with a carboxylic acido group.

2. Process for improving the resistance of rubber compositions to moisture, as claimed in claim 1, wherein the rubber composition is made from a latex rubber.

3. An unvulcanized rubber composition surface treated with a complex chromium compound of the Werner type wherein a trivalent nuclear chromium atom is coordinated with a carboxylic acido group.

4. A vulcanized moisture resistant rubber composition surface treated prior to vulcanisation, with a complex chromium compound of the Werner type wherein a trivalent nuclear chromium atom is co-ordinated with a carboxylic acido group.

5. A rubber composition in accordance with claim 3 wherein the chromium complex is methacrylate chromic chloride.

6. A rubber composition in accordance with claim 3 wherein the chromium complex is stearato chromic chloride.

References Cited in the file of this patent
UNITED STATES PATENTS

| 2,273,040 | Iler | Feb. 17, 1942 |
| 2,410,414 | Johnson | Nov. 5, 1946 |
| 2,582,278 | Prentiss | Jan. 15, 1952 |